"(12) United States Patent
Goto

(10) Patent No.: US 8,214,556 B2
(45) Date of Patent: Jul. 3, 2012

(54) CONTROLLING EXECUTION OF AN ACTION OBJECT AT A PERIPHERAL DEVICE BASED ON DATA STORED IN A REMOVABLE STORAGE MEDIUM

(75) Inventor: Satoru Goto, Ichikawa (JP)

(73) Assignee: Buffalo Inc., Nagoya (JP)

( * ) Notice: Subject to any disclaimer, the term of this patent is extended or adjusted under 35 U.S.C. 154(b) by 43 days.

(21) Appl. No.: 12/696,545

(22) Filed: Jan. 29, 2010

(65) Prior Publication Data

US 2010/0198993 A1   Aug. 5, 2010

(30) Foreign Application Priority Data

Jan. 30, 2009   (JP) ................................ P2009-020981

(51) Int. Cl.
*G06F 3/00* (2006.01)
*G06F 11/30* (2006.01)
*G06F 7/04* (2006.01)

(52) U.S. Cl. ............................. 710/36; 713/193; 726/27

(58) Field of Classification Search .................. 710/1, 5, 710/6, 36; 711/154, 163; 713/189, 193; 726/2, 26, 27
See application file for complete search history.

(56) References Cited

U.S. PATENT DOCUMENTS 5,894,571 A * 4/1999 O'Connor ........................ 713/2

FOREIGN PATENT DOCUMENTS

JP   2004-151785   5/2004

* cited by examiner

*Primary Examiner* — Richard B Franklin
(74) *Attorney, Agent, or Firm* — Oblon, Spivak, McClelland, Maier & Neustadt, L.L.P.

(57) ABSTRACT

A terminal device 100 to and from which a removal storage medium 200 is attached and removed includes a display 130 and a writer 150. The display 130 displays an action-command input region and an execution-subject input region, the action-command input region being used for inputting an action command to execute a certain action, the execution-subject input region being used for inputting an execution subject for the execution of the action command. The writer 150 writes the action command inputted in the action-command input region and the execution subject inputted in the execution-subject input region, into the removable storage medium.

9 Claims, 3 Drawing Sheets

CONTROLLING EXECUTION OF AN ACTION OBJECT AT A PERIPHERAL DEVICE BASED ON DATA STORED IN A REMOVABLE STORAGE MEDIUM

CROSS REFERENCE TO RELATED APPLICATION

This application is based upon and claims the benefit of priority from the prior Japanese Patent Application No. 2009-020981 filed on Jan. 30, 2009; the entire contents of which are incorporated herein by reference.

BACKGROUND OF THE INVENTION

1. Field of the Invention

The present invention relates to a terminal device configured to allow attachment and removal of a removable storage medium, and also relates to a peripheral device and a write program which are used for the terminal device.

2. Description of the Related Art

Conventionally, a USB memory is well-known as a removable storage medium, which can be attached to and removed from a terminal device such as a personal computer. As being normally used, the removable storage medium can be easily attached to a terminal device and easily removed from the terminal device. For example, in a case of a USB memory, it is plugged into a USB port provided to the terminal device and unplugged from the USB port provided to the terminal device.

It is herein noted that the removable storage medium can store an action command (program) that commands a terminal device to execute a certain action. In this respect, a technique has been proposed, which causes a terminal device to automatically execute the action command stored in a removable storage medium upon attachment of the removable storage medium to the terminal device (e.g., see Japanese Patent Application Publication No. 2004-151785).

To be more specific, when a removable storage medium is attached to a terminal device, the removable storage medium sends the terminal device a signal in a simulated manner, indicating that the medium is a specific device. A specific device means a object device (e.g., CD-ROM) for which an autostart script is executed by the terminal device. The terminal device executes the autostart script upon receipt of the signal sent from the removable storage medium, and automatically executes the action command stored in the removable storage medium.

SUMMARY OF THE INVENTION

With the conventional technique described above, in response to attachment of the removable storage medium to any terminal device, the terminal device unexceptionally executes the action command stored in the removable storage medium. In other words, no designation is made as to which terminal device should execute the action command stored in the removable storage medium.

Incidentally, in a case where a terminal device has a display or the like, the display can display information asking a user whether the action command stored in the removable storage medium should be executed or not. Thus, the user can select whether the action command stored in the removable storage medium should be executed or not.

However, in a case where the removable storage medium is attached to a peripheral device having no display or the like (e.g., network attached storage (NAS)), a user cannot select whether the action command stored in the removable storage medium should be executed or not.

In consideration of such circumstances, the present invention is to provide a terminal device, a peripheral device and a write program that allow an action command stored in a removable storage medium to be selectively executed upon detection of attachment of the removable storage medium.

An aspect of the present invention is that a terminal device (terminal device 100) includes an interface (first interface 110) configured to connect a removal storage medium (removable storage medium 200) to the interface, a display (display 130), and a writer (writer 150). The display displays an action-command input region and an execution-subject input region, the action-command input region being used for inputting an action command to execute a certain action, the execution-subject input region being used for inputting an execution subject for the execution of the action command. The writer is provided to write the action command inputted in the action-command input region and the execution subject inputted in the execution-subject input region, into the removable storage medium.

In the above aspect, the execution subject inputted in the execution-subject input region includes any information indicating a model of a device, a name of a device and any other information designating a device.

In the above aspect, the action command inputted in the action-command input region includes a command to read information stored in the removable storage medium, a command to write information stored in the execution subject into the removable storage medium, a command to copy information stored in the execution subject to a different device, or a command to move information stored in the execution subject to a different device.

An aspect of the present invention is that a peripheral device includes an interface (first interface 310) configured to connect a removal storage medium (removable storage medium 200) to the interface, a detector (detector 330), a determination unit (determination unit 340), and an executor (executor 350). The removal storage medium stores an action command to execute a certain action and an execution subject for the execution of the action command. The detector detects connection of the removable storage medium. The determination unit determines whether the peripheral device corresponds to the execution subject stored in the removable storage medium. The executor executes the action command stored in the removable storage medium when the peripheral device corresponds to the execution subject.

An aspect of the present invention is a write program which is used for a computer having an interface to which a removal storage medium is connected to execute the steps of: displaying an action-command input region and an execution-subject input region, the action-command input region being used for inputting an action command to execute a certain action, the execution-subject input region being used for inputting an execution subject for the execution of the action command; and writing the action command inputted in the action-command input region and the execution subject inputted in the execution-subject input region, into the removable storage medium.

The present invention can provide a terminal device, a peripheral device, and a write program, that allow an action command stored in a removable storage medium to be selectively executed upon detection of attachment of the removable storage medium.

DESCRIPTION OF THE EMBODIMENTS

Figure 1:
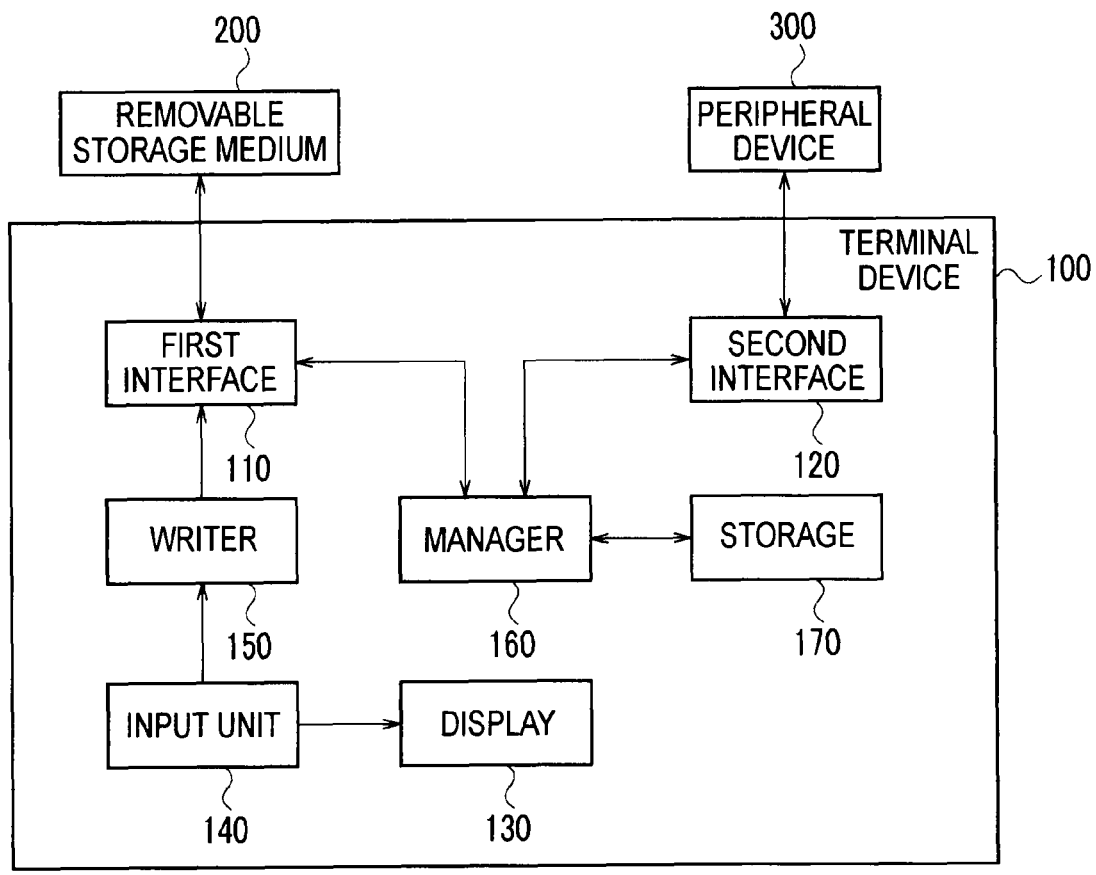
FIG. 1 is a block diagram showing a terminal device according to a first embodiment.

Embodiments of a terminal device according to the present invention will be described below referring to the drawings. Throughout the drawings, the same or like parts bear the same or like reference numerals. It should be noted, however, that the drawings are schematic, and that the dimensional proportions and the like are different from their actual values. Accordingly, specific dimensions and the like should be inferred based on the description given below. Moreover, dimensional relationships and proportions may differ from one drawing to another in some parts, of course.

First Embodiment

A first embodiment of the present invention will be described below with reference to the drawings. Specifically, what will be described are: (1) Configuration of Terminal Device; (2) Configuration of Peripheral Device; (3) Operations of Terminal Device and Peripheral Device; and (4) Advantageous Effects.

(1) Configuration of Terminal Device

Referring to FIG. 1, the configuration of a terminal device according to the first embodiment of the present invention is described. FIG. 1 is a block diagram showing a terminal device 100 according to the first embodiment.

The terminal device 100 according to the first embodiment is a device used for setting a certain action that a peripheral device 300 connected to the terminal device 100 through a LAN is to be commanded to execute.

As FIG. 1 shows, the terminal device 100 includes a first interface 110, a second interface 120, a display 130, an input unit 140, a writer 150, a manager 160, and a storage 170.

The first interface 110 is a hardware interface for connecting a removable storage medium 200 to the terminal device 100. For example, a USB port is used as the first interface 110 when a USB memory is used as the removable storage medium 200.

The second interface 120 is a hardware interface for connecting the terminal device 100 to one or more peripheral devices 300. For example, a LAN port or a wireless LAN port is used as the second interface 120. The terminal device 100 and the peripheral device 300 are thus connected to each other through a LAN.

The display 130 is a display device, such as a display placed on the front of the terminal device 100. The display 130 displays an action-command input region and an execution-subject input region. The action-command input region is used for inputting an action command to execute a certain action, and the execution-subject input region is used for inputting an execution subject for the execution of the action command.

In the execution-subject input region, the display 130 displays an execution subject inputted from the input unit 140. The execution subject inputted in the execution-subject input region is the model of a device, the name of a device, information designating all devices, or the like.

In the action command input region, the display 130 displays an action command inputted from the input unit 140. The action command inputted in the action-command input region includes a command to set a name for an execution subject, a command to read information stored in the removable storage medium 200, a command to write information stored in an execution subject into the removable storage medium 200, a command to copy information stored in an execution subject to a different device (not shown), a command to move information stored in an execution subject to a different device (not shown), or the like.

Of these action commands, the command to set a name for an execution subject includes a name given by a user of the terminal device 100.

Of the action commands, the command to read information stored in the removable storage medium 200 may include read-target designation information which designates information to be read. Further, the command to write information stored in an execution subject into the removable storage medium 200 may include write-target designation information which designates information to be written. The type of the information, the name of the information, or the like is used as the read-target designation information and the write-target designation information.

Of the action commands, the command to copy information stored in an execution subject to a different device (not shown) and the command to move information stored in an execution subject to a different device (not shown) each include information designating the different device. As the information designating the different device, the model of the different device, the name of the different device, information designating all devices except for an execution subject, or the like is used. The command to copy information stored in an execution subject to a different device (not shown) may include copy-target designation information which designates information to be copied. Further, the command to move information stored in an execution subject to a different device (not shown) may include move-target designation information which designates information to be moved. The type of the information, the name of the information, or the like is used as the copy-target designation information and the move-target designation information.

The input unit 140 is, for example, a receiver configured to receive a radio signal from a device, such as a touch panel, a keyboard, or a remote controller, which can be operated by the user of the terminal device 100.

From outside the terminal device 100, the input unit 140 receives input of an action command to execute a certain action and input of an execution subject which is to execute the action command.

Specifically, when acquiring certain information along with information designating the action-command input region, the input unit 140 receives the certain information as an action command. In other words, the action command is inputted using the action-command input region. Examples of the action command include a command to read information stored in the removable storage medium 200, a command to write information stored in an execution subject into the removable storage medium 200, a command to copy information stored in an execution subject to a different device, a command to move information stored in an execution subject to a different device, and the like. The input unit 140 inputs the received action command to the display 130 and to the writer 150.

Further, when acquiring certain information along with information designating the execution-subject input region, the input unit 140 receives particular information as an execution subject. In other words, the execution subject is inputted using the execution-subject input region. Examples of the execution subject include the model of a device, the name of a device, information designating all the devices, and the like. The input unit 140 inputs the received execution subject to the display 130 and to the writer 150.

From outside the terminal device 100, the input unit 140 receives a write command to write the action command inputted using the action-command input region and the execution subject inputted using the execution-subject input region, into the removable storage medium 200. The input unit 140 inputs the received write command to the writer 150.

The writer 150 writes the action command inputted using the action-command input region and the execution subject inputted using the execution-subject input region, into the removable storage medium 200.

Specifically, the writer 150 acquires the action command and the execution subject from the input unit 140. In addition, the writer 150 acquires the write command from the input unit 140. Upon receipt of the write command, the writer 150 writes the action command and the execution subject into the removable storage medium 200 through the first interface 110. Here, in a storage provided to the removable storage medium 200, the writer 150 writes the execution subject in a storage area different from the storage area in which the action command is written.

Figure 2:
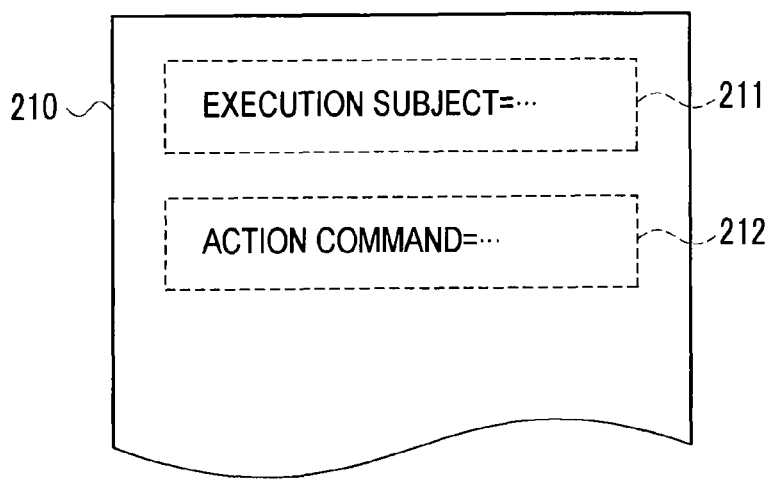
FIG. 2 is a diagram showing an example of a storage of a removable storage medium according to the first embodiment.

Since the writer 150 writes the action command and the execution subject in this way, the execution subject is stored independently from the action command in the storage provided to the removable storage medium 200. FIG. 2 is a diagram showing an example of the storage of the removable storage medium 200 after the writer 150 has written the action command and the execution subject. As FIG. 2 shows, in a storage 210 of the removable storage medium 200, the execution subject is stored in a storage area 211, whereas the action command is stored in a storage area 212. In this way, the action command and the execution subject are stored in different storage areas in the storage 210 of the removable storage medium 200.

The manager 160 manages information acquired through the first interface 110 and information acquired through the second interface 120.

Through the first interface 110, the manager 160 acquires information that has been stored in the removable storage medium 200. In the storage 170, the manager 160 stores the information that has been stored in the removable storage medium 200.

Further, through the second interface 120, the manager 160 acquires a set information notification. A set information notification is information sent from the peripheral device 300, and includes: a peripheral device ID that uniquely identifies the peripheral device 300; a set name set for the peripheral device 300 identified by the peripheral device ID; and an address of the peripheral device 300 identified by the peripheral device ID. Upon acquisition of the set information notification, the manager 160 inputs the peripheral device ID, set name, and address included in the set information notification, to the storage 170.

The set information notification may further include a model ID that identifies the model of the peripheral device 300 identified by the peripheral device ID. When the set information notification includes the model ID, the manager 160 inputs the peripheral device ID, set name, address, and model ID included in the set information notification, to the storage 170.

The storage 170 is a storage device, such as an HDD, storing certain information. The storage 170 stores information set for the terminal device 100, information acquired from the manager 160, and content information such as music files and document files.

First, as the information set for the terminal device 100, the storage 170 stores a terminal device ID that identifies the terminal device 100 and an address of the terminal device 100 in association with each other.

Second, from the manager 160, the storage 170 acquires the peripheral device ID that uniquely identifies the peripheral device 300, the address of the peripheral device 300 identified by the peripheral device ID, the model ID that identifies the model of the peripheral device 300 identified by the peripheral device ID, and the set name set for the peripheral device 300 identified by the peripheral device ID. The storage 170 stores the acquired peripheral device ID, address, model ID, and set name in association with one another.

Third, as the content information, the storage 170 stores content information acquired from the removable storage medium 200 through the first interface 110, content information acquired through the second interface 120, content information created by the own device, and the like.

(2) Configuration of Peripheral Device

Figure 3:
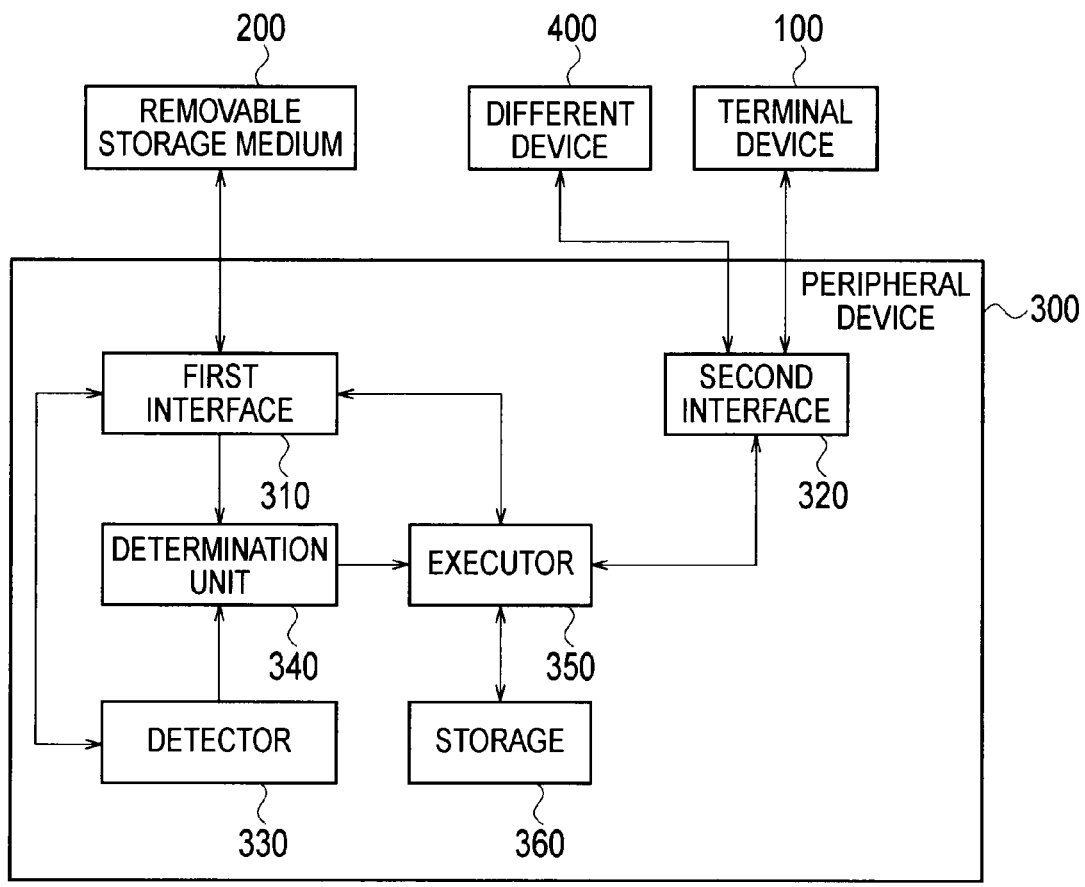
FIG. 3 is a block diagram showing a peripheral device according to the first embodiment.

Next, the configuration of the peripheral device according to the first embodiment of the present invention will be explained with reference to FIG. 3. FIG. 3 is a block diagram showing the peripheral device 300 according to the first embodiment.

The peripheral device 300 according to the first embodiment is such a device as to executes a certain action set by the terminal device 100 connected to the peripheral device 300 through a LAN.

As FIG. 3 shows, the peripheral device 300 is provided with a first interface 310, a second interface 320, a detector 330, a determination unit 340, an executor 350, and a storage 360.

The first interface 310 is a hardware interface for connecting the removable storage medium 200 to the peripheral device 300. For example, a USB port is used as the first interface 310 for a USB memory.

The second interface 320 works as a hardware interface for connecting the peripheral device 300 to the terminal device 100 and to a different peripheral device (called a different device below) 400. For example, the peripheral device 300 and the different device 400 are connected to each other through a LAN, using a LAN port or a wireless LAN port as the second interface 320. Since the different device 400 has the same configuration as the peripheral device 300, a description for the different device 400 is omitted here.

The detector 330 detects attachment of the removable storage medium 200 to the first interface 310. Upon detection of attachment of the removable storage medium 200, the detector 330 inputs a command to read the execution subject stored in the removable storage medium 200, to the determination unit 340.

The determination unit 340 determines whether the own device corresponds to the execution subject stored in the removable storage medium 200 or not. Specifically, from the detector 330, the determination unit 340 acquires the command to read the execution subject stored in the removable storage medium 200. Upon acquisition of the command to read the execution subject, the determination unit 340 reads the execution subject from the removable storage medium 200. The determination unit 340 determines whether the execution subject thus read corresponds to the own device or not. There is a case where no execution subject is stored in the removable storage medium 200, not allowing the determination unit 340 to read the execution subject. In this case, the determination unit 340 ends the processing.

If the model of a device has been read as the execution subject, the determination unit 340 determines whether the model thus read matches the model of the own device or not. When the read model matches the model of the own device, the determination unit 340 determines that the read execution subject corresponds to the own device.

If the name of a device has been read as the execution subject, the determination unit 340 determines whether the name thus read matches the set name of the own device or not. When the read name matches the set name of the own device, the determination unit 340 determines that the read execution subject corresponds to the own device.

If information designating all devices has been read as the execution subject, the determination unit 340 determines that the read execution subject corresponds to the own device.

When having determined that the read execution subject corresponds to the own device, the determination unit 340 reads the action command stored in the removable storage medium 200, and then inputs the action command thus read to the executor 350.

When having determined that the execution subject does not correspond to the own device, the determination unit 340 ends the processing.

When the own device corresponds to the execution subject stored in the removable storage medium 200, the executor 350 executes the action command stored in the removable storage medium 200. Specifically, when the determination unit 340 has determined that the execution subject read from the removable storage medium 200 corresponds to the own device, the executor 350 acquires the action command read from the removable storage medium 200, from the determination unit 340. The executor 350 then executes the action command thus acquired.

When the action command acquired is a command to set a name for the execution subject, the executor 350 sets a name for the own device, the name being designated by the action command. Specifically, in the storage 360, the executor 350 stores the name designated by the action command, in association with the peripheral device ID that identifies the own device. Thus, the executor 350 sets a name for the own device. The name set for the peripheral device 300 is hereinafter used as a set name.

After setting the name for the own device, the executor 350 sends a set information notification including information set for the own device, to the terminal device 100 through the second interface 320. Specifically, within the LAN to which the own device is connected, the executor 350 broadcasts the set information notification including the peripheral device ID that uniquely identifies the own device, the model ID that identifies the model of the own device, the address of the own device, and the set name of the own device. Thus, the set information notification including information set for the peripheral device 300 is transmitted to both of the terminal device 100 and the different device 400. It is possible that the executor 350 may broadcast the set information notification periodically. Note that the set information notification need not include the model ID.

The executor 350 receives a set information notification including information set for the different device 400 (e.g., such as a peripheral device ID that uniquely identifies the different device 400, a model ID that identifies the model of the different device 400, an address of the different device 400, and a set name of the different device 400), from the different device 400 through the second interface 320. The executor 350 inputs information included in the received set information notification, to the storage 360.

If the set name of the different device 400 included in the received set information notification matches the set name of the own device, the executor 350 changes the set name of the own device. After changing the set name of the own device, the executor 350 broadcasts a set information notification including the changed set name, within the LAN to which the own device is connected.

When the action command acquired is a command to read information stored in the removable storage medium 200, the executor 350 reads the information stored in the removable storage medium 200, through the first interface 310. The executor 350 then inputs the read information to the storage 360.

When the action command acquired is a command to write information stored in the execution subject into the removable storage medium 200, the executor 350 writes the information stored in the storage 360 into the removable storage medium 200, through the first interface 310.

When the action command acquired is a command to copy information stored in the execution subject to a different device, the executor 350 first reads the information stored in the storage 360. Then, the executor 350 sends the read information and a write command for the read information, to the different device 400 through the second interface 320. Here, the executor 350 first acquires the address of the different device 400 designated by the action command, from the storage 360, and then sends the read information and the write command, to the address thus acquired.

When the action command acquired is a command to move information stored in the execution subject to a different device, the executor 350 first reads the information stored in the storage 360. Then, the executor 350 sends the read information and a write command for the read information, to the different device 400 through the second interface 320, and deletes the read information from the storage 360. Here, the executor 350 first acquires the address of the different device 400 designated by the action command, from the storage 360, and then sends the read information and the write command, to the address thus acquired.

In case that either a command to copy or move information stored in the execution subject to a different device is supplied thereto as the action command, it is examined whether or not the address of the different device 400 designated by the action command is stored in the storage 360. If not, the executor 350 ends the processing.

The storage 360 is composed of a storage device, such as an HDD, storing certain information, which comprises information set for the peripheral device 300, information set for the different device 400 and content information such as music files and document files.

First, as the information set for the peripheral device 300, the storage 360 stores a peripheral device ID that identifies the own device, an address of the own device, a model ID that identifies the model of the own device and a device name set for the own device as being related to each other. It is herein noted that the model ID of the own device is not always stored in the storage 360.

Second, as the information set for the different device 400, the storage 360 acquires, for example, a set name of the different device 400, a model ID of the different device 400 and an address of the different device 400, from the executor 350. The storage 360 then stores the set name of the different device 400, the model ID of the different device 400 and the address of the different device 400 as being related to one another. Similarly, it is noted that the model ID of the different device 400 is not always stored in the storage 360.

Third, as the content information, the storage 360 stores content information acquired from the removable storage medium 200 through the first interface 310, content information acquired through the second interface 320 and the like.

Figure 4:
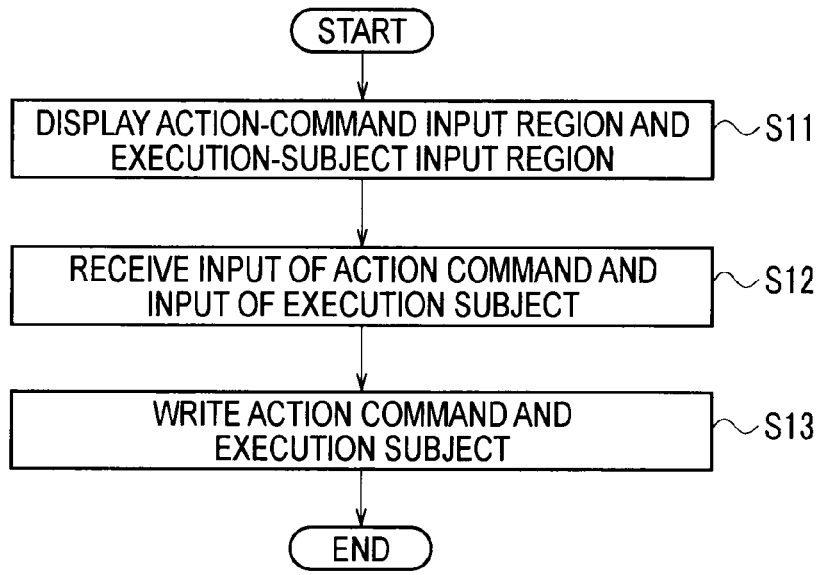
FIG. 4 is a flowchart of operations of the terminal device according to the first embodiment.

(3) Operations of Terminal Device and Peripheral Device (3.1) Operations of Terminal Device An operation of the terminal device according to the first embodiment of the present invention will be hereinafter explained with reference to FIG. 4. FIG. 4 is a flowchart showing operations of the terminal device 100 according to the first embodiment.

As shown in FIG. 4, the terminal device 100 is controlled in Step S11 to first display an action-command input region and an execution-subject input region.

In Step S12, the terminal device 100 is prepared to receive an action command to the action-command input region and an execution subject to the execution-subject input region, respectively.

In Step S13, the terminal device 100 writes the received action command and execution subject into the removable storage medium 200, and thus a series of the processing will be completed.

(3.2) Operations of Peripheral Device

Figure 5:
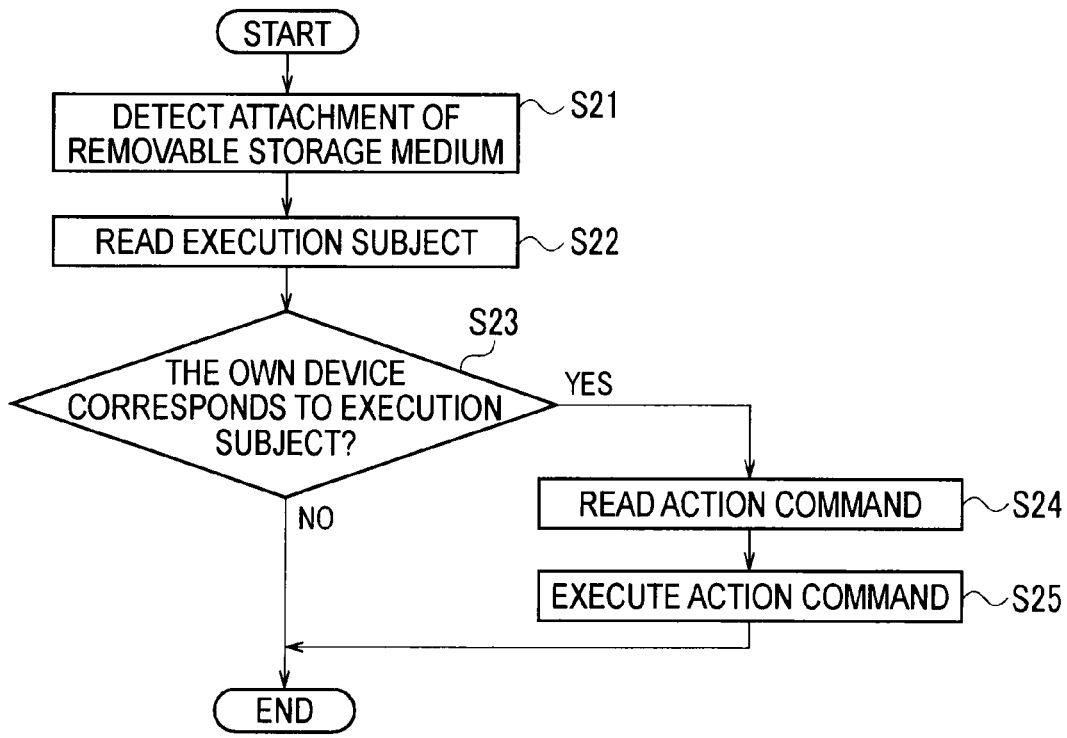
FIG. 5 is a flowchart of operations of the peripheral device according to the first embodiment.

Next, an operation of the peripheral device according to the first embodiment of the present invention will be explained with reference to FIG. 5. FIG. 5 is a flowchart showing operations of the peripheral device 300 according to the first embodiment.

As shown in FIG. 5, in Step S21, the peripheral device 300 is firstly controlled to detect attachment of the removable storage medium 200.

In Step S22, the peripheral device 300 reads the execution subject stored in the removable storage medium 200.

In Step S23, it is determined in the peripheral device 300 determines whether or not the own device corresponds to the execution subject stored in the removable storage medium 200. When having determined that the execution subject stored in the removable storage medium 200 corresponds to the own device, the peripheral device 300 proceeds to Step S24. On the other hand, when having determined that the execution subject stored in the removable storage medium 200 does not correspond to the own device, the peripheral device 300 is controlled to complete the processing.

In Step S24, the peripheral device 300 reads the action command stored in the removable storage medium 200.

In Step S25, finally the peripheral device 300 executes the action command read from the removable storage medium 200, and then a series of the processing will be completed.

(3.3) Specific Examples of Operations of Terminal Device and Peripheral Device

Next, a specific example of the operations of the terminal device and the peripheral device according to the first embodiment of the present invention will be described under the assumption that the terminal device 100 and two peripheral devices 300 (a first peripheral device and a second peripheral device which are not shown in the drawing) are connected to one another through a LAN.

It is herein assumed that the terminal device 100 pre-stores a peripheral device ID, an address, and a model ID of the first and second peripheral devices, as being related to one another.

(3.3.1) Specific Example of Setting a Name for a Peripheral Device

First, the terminal device 100 displays an action-command input region and an execution-subject input region.

Next, the terminal device 100 is prepared to receive an action command and an execution subject. Specifically, a command of "NAME(NAS1)" is inputted as the action command, wherein the "NAME(NAS1)" means to set the name of "NAS1" with respect to the execution subject, and "NAS1" in the parentheses indicates the name of the execution subject itself. Further, in case of designating all the peripheral devices 300, a command of "ANY" is inputted as the execution subject.

Then, the terminal device 100 writes the action command ("NAME(NAS1)") and the execution subject ("ANY") into the removable storage medium 200, in respective areas.

Next, the removable storage medium 200 storing the action command ("NAME(NAS1)") and the execution subject ("ANY") is attached to the first peripheral device.

Then, the first peripheral device detects attachment of the removable storage medium 200 storing the action command ("NAME(NAS1)") and the execution subject ("ANY").

Next, the first peripheral device reads the execution subject ("ANY") from the removable storage medium 200. Here, since the execution subject "ANY" designates all the peripheral devices 300, the first peripheral device recognizes that the execution subject corresponds to the own device.

Next, the first peripheral device reads the action command ("NAME(NAS1)") from the removable storage medium 200. As described before, the command "NAME(NAS1)" is to set the name "NAS1" with respect to the execution subject. Accordingly, the first peripheral device stores "NAS1" as a set name of the own device. Next, the first peripheral device sends the terminal device 100 a set of information notification including "A" as a peripheral device ID that identifies the own device, "ADD1" as an address of the own device and "NAS1" as a set name.

Next, the terminal device 100 stores the peripheral device ID "A", the address "ADD1", and the set name "NAS1" included in the set of information notification, as being related to one another. As a result, in the storage 170 of the terminal device 100, the peripheral device ID of the first peripheral device 301 ("A"), the address of the first peripheral device 301 ("ADD1"), and the set name of the first peripheral device 301 ("NAS1") are associated with one another.

By making the same processing, a specific name will be set with respect to the second peripheral device as well. For example, in order to set the name of the second peripheral device as "NAS2", the command "NAME(NAS2)" is stored in the removable storage medium 200.

It is herein noted that the first peripheral device and the second peripheral device broadcast the set information notification within the LAN to which the own device is connected. Then, the first peripheral device and the second peripheral device receive the set information notification broadcasted within the LAN, and the peripheral devices are controlled to change the set name of the own device if the set name of the own device matches a set name included in the set information notification thus received (i.e., a name set of a peripheral device other than the own device). After changing the set name of the own device, the first and second peripheral devices broadcast a set information notification including the changed set name, within the LAN to which the own device is connected.

The following will be described assuming descriptions assume that "NAS1" is set for the name of the first peripheral device, and that "NAS2" is set for the name of the second peripheral device.

(3.3.2) Specific Example of Reading Information Stored in a Removable Storage Medium First, the terminal device 100 displays an action-command input region and an execution-subject input region. Next, the terminal device 100 is prepared to receive an action command and an execution subject. When the action command "READ (FILE1)" is inputted to the peripheral device 100, the command "READ(FILE1)" requests the execution subject to read information corresponding to "FILE1" from the removable storage medium 200, wherein "FILE1" in the parentheses indicates read-target designation information. In addition, "NAS1" which indicates the name of the first peripheral device is inputted as the execution subject.

Then, the terminal device 100 writes the action command ("READ(FILE1)") and the execution subject ("NAS1") into the removable storage medium 200, in respective areas.

Next, the removable storage medium 200 storing the action command ("READ(FILE1)") and the execution subject ("NAS1") is attached to the peripheral device 300.

First, a description is given of a case where the removable storage medium 200 storing the action command ("READ (FILE1)") and the execution subject ("NAS1") is attached to the first peripheral device.

The first peripheral device first detects attachment of the removable storage medium 200 storing the action command ("READ(FILE1)") and the execution subject ("NAS1").

Next, the first peripheral device reads the execution subject ("NAS1") from the removable storage medium 200, and determines whether or not the read execution subject corresponds to the own device. Here, since "NAS1" read as the execution subject matches the set name set for the first peripheral device itself, the first peripheral device determines that the execution subject corresponds to the own device.

Then, the first peripheral device reads the action command ("READ(FILE1)") from the removable storage medium 200. As described, "READ(FILE1)" read as the action command here commands the execution subject to read information corresponding to "FILE1" from the removable storage medium 200. Accordingly, the first peripheral device reads out the information corresponding to "FILE1" from the information stored in the removable storage medium 200.

Second, a description is given of a case where the removable storage medium 200 storing the action command ("READ(FILE1)") and the execution subject ("NAS1") is attached to the second peripheral device 302.

The second peripheral device first detects attachment of the removable storage medium 200 storing the action command ("READ(FILE1)") and the execution subject ("NAS1").

Next, the second peripheral device reads the execution subject ("NAS1") from the removable storage medium 200, and determines whether or not the read execution subject matches the own device. Here, "NAS1" read as the execution subject does not match the set name "NAS2" set for the second peripheral device itself. Accordingly, the second peripheral device determines that the execution subject does not correspond to the own device, and terminates the processing.

(3.3.3) Specific Example of Writing Information Stored in an Execution Subject into a Removable Storage Medium First, the terminal device 100 displays an action-command input region and an execution-subject input region.

Next, the terminal device 100 receives input of an action command and an execution subject. Here, "WRITE(FILE2)" is inputted as the action command. "WRITE(FILE2)" indicates a command to write information stored in the execution subject into the removable storage medium 200, and "FILE2" in the parentheses indicates write-target designation information. Accordingly, "WRITE(FILE2)" commands the execution subject to write information corresponding to "FILE2" into the removable storage medium 200. In addition, "NAS1" which indicates the name of the first peripheral device is inputted as the execution subject.

Then, the terminal device 100 writes the action command ("WRITE(FILE2)") and the execution subject ("NAS1") into the removable storage medium 200, in respective areas.

Next, the removable storage medium 200 storing the action command ("WRITE(FILE2)") and the execution subject ("NAS1") is attached to the peripheral device 300.

First, a description is given of a case where the removable storage medium 200 storing the action command ("WRITE (FILE2)") and the execution subject ("NAS1") is attached to the first peripheral device.

The first peripheral device 301 first detects attachment of the removable storage medium 200 storing the action command ("WRITE(FILE2)") and the execution subject ("NAS1").

Next, the first peripheral device reads the execution subject ("NAS1") from the removable storage medium 200, and determines whether the read execution subject corresponds to the own device or not. Here, since "NAS1" read as the execution subject matches the set name set for the first peripheral device itself, the first peripheral device determines that the execution subject corresponds to the own device.

Then, the first peripheral device reads the action command ("WRITE(FILE2)") from the removable storage medium 200. As described, "WRITE(FILE2)" read as the action command here commands the execution subject to write information corresponding to "FILE2" into the removable storage medium 200. Accordingly, from among information pieces stored in the first peripheral device, the first peripheral device 301 reads information corresponding to "FILE2". The first peripheral device stores the read information, namely, the information corresponding to "FILE2", in the removable storage medium 200.

Second, a description is given of a case where the removable storage medium 200 storing the action command ("WRITE(FILE2)") and the execution subject ("NAS1") is attached to the second peripheral device.

The second peripheral device first detects attachment of the removable storage medium 200 storing the action command ("WRITE(FILE2)") and the execution subject ("NAS1").

Next, the second peripheral device reads the execution subject ("NAS1") from the removable storage medium 200, and determines whether the read execution subject matches the own device or not. Here, "NAS1" read as the execution subject does not match the set name "NAS2" set for the second peripheral device 302 itself. Accordingly, the second peripheral device determines that the execution subject does not correspond to the own device, and ends the processing.

(3.3.4) Specific Example of Copying Information Stored in an Execution Subject to a Different Device First, the terminal device 100 displays an action-command input region and an execution-subject input region.

Next, the terminal device 100 is prepared to receive an action command and an execution subject. Here, the command "COPY(FILE3/NAS2)" is inputted to copy information stored in the execution subject to a different device, wherein "FILE3" in the parentheses indicates copy-target designation information and. "NAS2" in the parentheses indicates the different device to which the copy-target designation information is to be copied. Accordingly, it means that the command "COPY(FILE3/NAS2)" causes to copy the information of "FILE3" to the different device corresponding to "NAS2". In addition, the device "NAS1" which indicates the name of the first peripheral device is inputted as the execution subject.

Next, the terminal device 100 controls to write the action command ("COPY(FILE3/NAS2)") and the execution subject ("NAS1") into the respective areas of the removable storage medium 200.

Then, the removable storage medium 200 storing the action command ("COPY(FILE3/NAS2)") and the execution subject ("NAS1") therein is attached to the peripheral device 300.

First, the operation of this device in which the removable storage medium 200 storing the action command ("COPY(FILE3/NAS2)") and the execution subject ("NAS1") is attached to the first peripheral device will be described hereinafter.

The first peripheral device first detects attachment of the removable storage medium 200 storing the action command ("COPY(FILE3/NAS2)") and the execution subject ("NAS1"). And then the first peripheral device reads the execution subject ("NAS1") from the removable storage medium 200 to determine whether the read execution subject corresponds to the own device or not. Here, since the execution subject "NAS1" matches the set name set for the first peripheral device itself, the first peripheral device determines that the execution subject corresponds to the own device.

Next, the first peripheral device reads the action command ("COPY(FILE3/NAS2)") from the removable storage medium 200. As described, the action command "COPY(FILE3/NAS2)" here works as the execution subject to copy the information of "FILE3" to the different device corresponding to "NAS2". Accordingly, from among information pieces stored in the first peripheral device 301, the first peripheral device operates to read the information "FILE3" from the former device, and also to read an address of the different device corresponding to "NAS2", namely, the address of the second peripheral device. The first peripheral device then sends the information "FILE3" and a command signal instructing to store the information "FILE3", to the address of the second peripheral device. It is noted that, if the address of the different device "NAS2", namely the address of the second peripheral device, is not stored in the first peripheral device, the first peripheral device terminates the processing of copying.

Second, the operation of this device in which the removable storage medium 200 storing the action command ("COPY(FILE3/NAS2)") and the execution subject ("NAS1") is attached to the second peripheral device will be described in more detail.

The second peripheral device 302 first detects attachment of the removable storage medium 200 storing the action command ("COPY(FILE3/NAS2)") and the execution subject ("NAS1"). And then the second peripheral device reads the execution subject ("NAS1") from the removable storage medium 200 to determines whether the read execution subject matches the own device or not. Here, the execution subject "NAS1" does not match the set name "NAS2" set for the second peripheral device itself. Accordingly, the second peripheral device recognizes that the execution subject does not correspond to the own device, and therefore terminates the processing thereof.

(3.3.5) Specific Example of Moving Information Stored in an Execution Subject to a Different Device First, the terminal device 100 is controlled to display an action-command input region and an execution-subject input region, and then is prepared to receive an action command and an execution subject. Here, the action command "MOVE(FILE4/NAS2)" works to move the information stored in the execution subject to a different device, wherein "FILE4" in the parentheses indicates move-target designation information and "NAS2" in the parentheses indicates the different device to which the move-target designation information is to be moved. Accordingly, the execution subject "MOVE(FILE4/NAS2)" causes to move the information "FILE4" to the different device "NAS2". Further, "NAS1" which indicates the name of the first peripheral device 301 is inputted as the execution subject.

Next, the terminal device 100 writes the action command ("MOVE(FILE4/NAS2)") and the execution subject ("NAS1") into the respective areas of the removable storage medium 200.

Then, the removable storage medium 200 storing the action command ("MOVE(FILE4/NAS2)") and the execution subject ("NAS1") is attached to the peripheral device 300.

First, the operation of this device wherein the removable storage medium 200 storing the action command ("MOVE(FILE4/NAS2)") and the execution subject ("NAS1") is attached to the first peripheral device will be explained in more detail.

The first peripheral device first detects attachment of the removable storage medium 200 storing the action command ("MOVE(FILE4/NAS2)") and the execution subject ("NAS1"), and then the first peripheral device reads the execution subject ("NAS1") from the removable storage medium 200 therefrom, and determines whether the read execution subject corresponds to the own device or not. Here, since the execution subject "NAS1" matches the set name used for the first peripheral device itself, the first peripheral device recognizes that the execution subject corresponds to the own device.

Next, the first peripheral device reads the action command ("MOVE(FILE4/NAS2)") from the removable storage medium 200. As described before, the action command "MOVE(FILE4/NAS2)" instructs the execution subject to move the information "FILE4" to the different device "NAS2". Accordingly, the first peripheral device 301 reads the information "FILE4" and an address of the different device "NAS2", namely, the address of the second peripheral device from the first peripheral device. The first peripheral device then sends the information "FILE4" and a command signal instruction to store the information "FILE4" to the address of the second peripheral device. After sending the information "FILE4" and the command signal, the first peripheral device deletes the information "FILE4" from the first peripheral device. Note that, if the address of the different device "NAS2", namely the address of the second peripheral device, is not stored in the first peripheral device, the first peripheral device terminates the processing of moving.

Second, the operation of the device wherein the removable storage medium 200 storing the action command ("MOVE(FILE4/NAS2)") and the execution subject ("NAS1") is attached to the second peripheral device.

The second peripheral device first detects attachment of the removable storage medium 200 storing the action command ("MOVE(FILE4/NAS2)") and the execution subject ("NAS1"), and then the second peripheral device reads the execution subject ("NAS1") from the removable storage medium 200, and determines whether the read execution subject matches the own device or not. Here, the execution subject "NAS1" does not match the set name "NAS2" used for the second peripheral device itself. Accordingly, the second peripheral device determines that the execution subject does not correspond to the own device, and terminates the processing of moving.

(4) Advantageous Effects

In the terminal device 100 according to the first embodiment of the present invention, the display 130 displays an action-command input region used for inputting an action command to execute a certain action, and an execution-subject input region used for inputting an execution subject which is to execute the action command. The writer 150 then writes an action command inputted in the action-command input region and an execution subject inputted in the execution-subject input region into the removable storage medium 200. Here, in the storage provided to the removable storage medium 200, the writer 150 is controlled to write the execution subject in a storage area different from the storage area in which the action command is written. Thereby, in the removable storage medium 200, the execution subject is stored independently from the action command.

Further, in the peripheral device 300 according to the first embodiment of the present invention, upon detection of attachment of the removable storage medium 200, the determination unit 340 determines whether the execution subject stored in the removable storage medium 200 corresponds to the own device or not. Then, when having determined that the execution subject stored in the removable storage medium 200 corresponds to the own device, the executor 350 executes the action command stored in the removable storage medium 200.

Since the execution subject is stored independently from the action command in the removable storage medium 200 as described above, the peripheral device 300 is allowed to determine whether the execution subject corresponds to the own device or not. Then, the peripheral device 300 can select whether to execute the action command, based on the determination on whether the execution subject corresponds to the own device.

The peripheral device 300 executes the action command if the own device corresponds to the execution subject. Thus, even when a NAS or the like having no display is used as the peripheral device 300, the peripheral device 300 can select whether to execute the action command.

As described, according to the first embodiment of the present invention, the peripheral device 300 can selectively execute the action command stored in the removable storage medium 200 upon detection of attachment of the removable storage medium 200.

Other Embodiments

The contents of the present invention have been described above using the embodiment of the present invention. It should be understood, however, that the descriptions and the drawings that constitute part of the disclosure do not limit the present invention. This disclosure will make various alternative embodiments, examples, and operation techniques apparent to those skilled in the art.

For example, although described as such in the above first embodiment, the present invention is not limited to a case where the removable storage medium 200 stores only a single combination of an action command and an execution subject. For example, the removable storage medium 200 may store two or more combinations of an action command and an execution subject. Even when the removable storage medium 200 stores multiple combinations of an action command and an execution subject, the peripheral device 300 can selectively execute the action command that corresponds to the execution subject corresponding to the own device.

Moreover, although described as such in the above first embodiment, the present invention is not limited to a case where a LAN port, a wireless LAN port, or the like is used as the second interface 120 and the second interface 320. For example, the terminal device 100 and the peripheral device 300 can be directly connected to each other using a USB port, an IEEE1394 port, or the like as the second interface 120 and the second interface 320.

Furthermore, although described as such in the above first embodiment, the present invention is not limited to a case where the peripheral device 300 ends processing when an action command received is either a command to copy information stored in an execution subject to a different device, or a command to move information stored in an execution subject to a different device, and when the peripheral device 300 does not store the address of the different device 400 designated by the action command. For example, the action command may include the address of the different device 400 by using the address of the different device 400 as information designating the different device 400.

In addition, for example, a program for causing a computer to execute the operations of the terminal device 100 (i.e., the flow shown in FIG. 4) may be provided. Further, a storage medium storing such program may be provided. The storage medium storing the program is, for example, a CD-ROM that comes with the terminal device 100, or the like.

In addition, for example, a program for causing a computer to execute the operations of the peripheral device 300 (i.e., the flow shown in FIG. 5) may be provided. Further, a storage medium storing such program may be provided. The storage medium storing the program is, for example, a CD-ROM that comes with the peripheral device 300, or the like.

As described above, the present invention of course includes various embodiments and the like that are not described herein. Therefore, the technical scope of the present invention is to be determined based solely on claimed elements according to the scope of claims reasonably understood from the above description.

What is claimed is:

1. A peripheral device comprising:
an interface configured to connect to a removable storage medium, the removable storage medium storing an action command to execute a certain action and an execution subject indicating a device to execute the action command;
a detector configured to detect connection of the removable storage medium and directly in response to the connection being detected, to transmit a command to retrieve the execution subject stored in the removable storage medium to a processor; and
the processor configured to acquire the execution subject from the removable storage medium in response to the command received from the detector, and to determine whether the peripheral device corresponds to the acquired execution subject stored in the removable storage medium, and to execute the action command stored in the removable storage medium when the peripheral device corresponds to the execution subject, wherein
the action command stored in the removable storage medium includes a command to write information stored in the execution subject into the removable storage medium, a command to copy information stored in the execution subject to a different device, or a command to move information stored in the execution subject to a different device.

2. The peripheral device according to claim 1, wherein the execution subject stored in the removable storage medium includes any information indicating a model of a device, a name of a device, or any other information designating a device.

3. The peripheral device according to claim 1, wherein the action command stored in the removable storage medium includes a command to read information stored in the removable storage medium.

4. The peripheral device according to claim 1, further comprising:
a memory configured to store information, wherein
when the action command stored in the removable storage medium includes a command to write information stored in the execution subject into the removable storage medium, the processor is configured to retrieve information stored in the memory and write the retrieved information to the removable storage medium via the interface.

5. The peripheral device according to claim 1, further comprising:
a network interface configured to connect to the different device via a network; and
a memory configured to store information, wherein
when the action command stored in the removable storage medium includes a command to copy information stored in the execution subject to a different device, the processor is configured to retrieve information stored in the memory and control the network interface to send the retrieved information and a write command for the retrieved information to the different device.

6. The peripheral device according to claim 1, further comprising:
a network interface configured to connect to the different device via a network; and
a memory configured to store information, wherein
when the action command stored in the removable storage medium includes a command to move information stored in the execution subject to a different device, the processor is configured to retrieve information stored in the memory, control the network interface to send the retrieved information and a write command for the retrieved information to the different device, and delete the retrieved information from the memory.

7. The peripheral device according to claim 1, wherein the action command and the execution subject are stored in the removable storage medium by a terminal device.

8. A method performed by a peripheral device, the method comprising:
detecting, by a detector, connection of a removable storage medium to an interface of the peripheral device, the removable storage medium storing an action command to execute a certain action and an execution subject indicating a device to execute the action command;
transmitting, from the detector, a command to retrieve the execution subject stored in the removable storage medium to a processor of the peripheral device directly in response to the connection being detected;
acquiring, by the processor of the peripheral device, the execution subject from the removable storage medium in response to the command received from the detector;
determining, by the processor of the peripheral device, whether the peripheral device corresponds to the acquired execution subject stored in the removable storage medium; and
executing, by the processor, the action command stored in the removable storage medium when the peripheral device corresponds to the execution subject, wherein
the action command stored in the removable storage medium includes a command to write information stored in the execution subject into the removable storage medium, a command to copy information stored in the execution subject to a different device, or a command to move information stored in the execution subject to a different device.

9. A non-transitory computer-readable medium including computer program instructions, which when executed by a peripheral device, cause the peripheral device to perform a method comprising:
detecting connection of a removable storage medium to the peripheral device, the removable storage medium storing an action command to execute a certain action and an execution subject indicating a device to execute the action command;
transmitting a command to retrieve the execution subject stored in the removable storage medium to a processor of the peripheral device directly in response to the connection being detected;
acquiring, by the processor of the peripheral device, the execution subject from the removable storage medium in response to the received command;
determining whether the peripheral device corresponds to the acquired execution subject stored in the removable storage medium; and
executing the action command stored in the removable storage medium when the peripheral device corresponds to the execution subject, wherein
the action command stored in the removable storage medium includes a command to write information stored in the execution subject into the removable storage medium, a command to copy information stored in the execution subject to a different device, or a command to move information stored in the execution subject to a different device.

* * * * *